(12) United States Patent
Butler, Jr.

(10) Patent No.: US 9,169,114 B2
(45) Date of Patent: Oct. 27, 2015

(54) AUTOMATED SYSTEM FOR FUELING VEHICLES

(71) Applicant: Charles Roland Butler, Jr., High Point, NC (US)

(72) Inventor: Charles Roland Butler, Jr., High Point, NC (US)

(*) Notice: Subject to any disclaimer, the term of this patent is extended or adjusted under 35 U.S.C. 154(b) by 297 days.

(21) Appl. No.: 13/863,093

(22) Filed: Apr. 15, 2013

(65) Prior Publication Data

US 2014/0305545 A1 Oct. 16, 2014

(51) Int. Cl.
| | |
|---|---|
| *B67D 7/04* | (2010.01) |
| *B67D 7/34* | (2010.01) |
| *G06Q 20/18* | (2012.01) |
| *G07F 13/02* | (2006.01) |

(52) U.S. Cl.
CPC ............. *B67D 7/0401* (2013.01); *B67D 7/348* (2013.01); *G06Q 20/18* (2013.01); *G07F 13/025* (2013.01); *B67D 2007/0419* (2013.01); *B67D 2007/0442* (2013.01); *B67D 2007/0461* (2013.01)

(58) Field of Classification Search
CPC .. B67D 7/0401; B67D 7/0407; B67D 7/0415; B67D 7/0419; B67D 7/043; B67D 7/0434; B67D 7/0436; B67D 7/0438; B67D 7/0442; B67D 7/0444; B67D 7/0455; B67D 7/0457; B67D 7/0459; B67D 7/0461; B67D 7/0463; B67D 7/0465; B67D 7/0467; B67D 7/0469; B67D 7/0471; B67D 7/0473; B67D 7/0474
USPC ............................................. 141/94, 98, 192
See application file for complete search history.

(56) References Cited

U.S. PATENT DOCUMENTS

| | | | | |
|---|---|---|---|---|
| 3,364,940 | A | * | 1/1968 | Ginsburgh et al. ........ 137/234.6 |
| 3,410,320 | A | * | 11/1968 | Ginsburgh et al. ............. 141/98 |
| 3,527,268 | A | * | 9/1970 | Ginsburgh ........................ 141/98 |
| 3,642,036 | A | * | 2/1972 | Ginsburgh et al. ............. 141/94 |
| 4,881,581 | A | * | 11/1989 | Hollerback .................... 141/113 |
| 5,238,034 | A | * | 8/1993 | Corfitsen .......................... 141/94 |
| 5,383,500 | A | * | 1/1995 | Dwars et al. ..................... 141/98 |
| 5,404,923 | A | * | 4/1995 | Yamamoto et al. ............ 141/279 |
| 5,609,190 | A | * | 3/1997 | Anderson et al. ............... 141/59 |
| 5,628,351 | A | * | 5/1997 | Ramsey et al. .................. 141/98 |
| 5,634,503 | A | * | 6/1997 | Musil et al. .................... 141/232 |
| 6,024,137 | A | * | 2/2000 | Strnad et al. ....................... 141/1 |
| 6,157,162 | A | * | 12/2000 | Hayashi et al. ............... 320/104 |
| 6,202,712 | B1 | * | 3/2001 | Aguilar ........................... 141/98 |
| 6,237,647 | B1 | | 5/2001 | Pong et al. |
| 6,338,008 | B1 | | 1/2002 | Kohut et al. |

(Continued)

FOREIGN PATENT DOCUMENTS

EP  1074444 A2  2/2001

OTHER PUBLICATIONS

Koch, W., "Is the Long Wait for Robotic Fueling Finally Over?", Petroleum Equipment & Technology, Oct. 1, 1997, pp. 14, 16-18, and 49, retrieved from internet: http://www.t-r-i.com/gifs/xPET5-97.pdf.

(Continued)

*Primary Examiner* — Nicholas A Arnett
(74) *Attorney, Agent, or Firm* — Coats and Bennett, PLLC

(57) ABSTRACT

An automated fueling system in which an operator remains in their vehicle. The fueling system is configured to obtain transaction information from the operator, align the vehicle relative to a fuel pump, and to deliver the fuel to the vehicle. Once the process is complete, the operator can drive their vehicle away from the station.

20 Claims, 13 Drawing Sheets

(56) References Cited

U.S. PATENT DOCUMENTS

| | | | |
|---|---|---|---|
| 6,354,343 B1* | 3/2002 | Strnad et al. | 141/94 |
| 6,418,985 B2* | 7/2002 | Aguilar | 141/98 |
| 6,640,846 B2* | 11/2003 | Baroldy et al. | 141/94 |
| 6,761,192 B2* | 7/2004 | Horvath et al. | 141/98 |
| 7,891,387 B2* | 2/2011 | Lim et al. | 141/98 |
| 8,164,302 B2* | 4/2012 | Capizzo | 320/109 |
| 8,393,362 B1* | 3/2013 | Hollerback | 141/94 |
| 8,461,804 B1* | 6/2013 | Capizzo | 320/109 |
| 2002/0096226 A1* | 7/2002 | Strnad et al. | 141/94 |
| 2004/0067124 A1 | 4/2004 | Lee | |
| 2007/0113921 A1* | 5/2007 | Capizzo | 141/231 |
| 2009/0126208 A1 | 5/2009 | Suita et al. | |
| 2009/0314382 A1* | 12/2009 | Capizzo | 141/2 |

OTHER PUBLICATIONS

International Search Report mailed Mar. 16, 2015 in re International Application No. PCT/US2014/033594 filed Apr. 10, 2014.

* cited by examiner

US 9,169,114 B2

AUTOMATED SYSTEM FOR FUELING VEHICLES

BACKGROUND

The present application is directed to a system for fueling vehicles and, more particularly, an automated fueling system in which the vehicle operator remains in the vehicle during the fueling process.

Fueling stations are commonplace in today's society. The most readily seen station is a gas station that includes one or more fuel pumps that are able to dispense one or more different types of fuel. A vehicle operator drives their vehicle to one of the pumps and stops their vehicle. The operator then exits the vehicle to pay for the fuel and then dispense the fuel. At some stations, the operator may be required to walk to a nearby kiosk or store to pay for the fuel. Alternatively, the pump may be equipped with an interface to receive credit card payment. The user may also remove a fuel nozzle and corresponding hose from the pump and place the nozzle into the gas tank in their vehicle to dispense the fuel. Once complete, the nozzle and hose are returned to the pump, the user closes their fuel tank, and is then able to drive away in their vehicle. This type of fueling system includes a variety of disadvantages.

One disadvantage is the vehicle operator is required to exit the vehicle. Exiting the vehicle may expose the operator to unsafe conditions in which they may be robbed or worse. This is more likely in certain circumstances, such as when the operator is alone, the fueling occurs at night, or the station is in an area with a history of crime.

Exiting the vehicle also exposes the operator to adverse weather conditions. It may be raining at the time of fueling thus causing the operator to get wet while they perform the refueling. Likewise, the weather may be frigidly cold or excessively hot, either of which exposes the operator to be placed in physically uncomfortable situations.

From a business efficiency perspective, requiring the operator to exit the vehicle to fuel their vehicle is a relatively slow process that limits the throughput of the number of fuelings that can occur within a given time period. Operators may spend an excessive amount of time to complete the fueling due to a variety of different factors, such as being unfamiliar with how to pump the fuel, and being unfamiliar with the payment interface. This reduces the number of operators that can be serviced and thus may reduce the profitability of the station.

SUMMARY

The present application is directed to an automatic fueling system for delivering fuel to a vehicle. In general, the system includes a payment system, an alignment system, and a fueling system. The driver may remain in their vehicle during the fueling process.

One embodiment of using the system includes that the driver pulls up to a payment system that may include a credit card machine or a cash receiving machine. The driver enters desired amount of fuel and makes the payment. The driver then pulls forward until an indicator illuminates indicating that a nozzle of the fueling system is aligned with the vehicle fuel inlet relative to the horizontal position of the car. The alignment position of the vehicle may be the same for the various vehicles that are serviced by the system. This may include various positions relative to the fueling system. Once aligned, the fuel door is opened and the vehicle ignition is disabled. In one specific embodiment, the vehicle includes an automatic fuel button that disables the car ignition circuit and at the same time opens the gas lid door. The fuel nozzle is then moved vertically to align with the fuel inlet. When aligned, the nozzle extends into the funnel and into the neck of the fuel inlet. There is a sensor that stops the fuel nozzle at a fixed distance into the tank. When sensors are aligned, this stops the nozzle and makes the pump start pumping the desired amount of fuel. When the desired amount of fuel is pumped, the pump will turn off and the nozzle automatically starts retracting. When the nozzle starts retracting, the sensor will signal that the nozzle is no longer in the fueling position. Once complete, the driver will push the automatic fuel button on the dash again, which will close the fuel door and enable the ignition of the car so the car can be started and driven away.

Another embodiment is directed to an automated system to fuel a vehicle such that a user remains within the vehicle during fueling. The system includes a drive system with a support member configured to be positioned under the vehicle and sized to receive at least one tire of the vehicle with the drive system configured to move the support member and the vehicle along a lane. An alignment system is configured to be positioned at a stationary point along the lane and configured to horizontally align the vehicle at a predetermined position along the lane as the vehicle is being moved by the drive system. The alignment system includes a first target mounted to the vehicle at a first distance from a fuel inlet of the vehicle and a first sensor to detect the first target when the vehicle is at the predetermined position. The system also includes a fueling system configured to be positioned along the lane and including a hose, a second sensor mounted to the hose, and a second target mounted to the vehicle at a second predetermined distance from the fuel inlet. The second target is spaced apart from the first target, and the sensor is configured to detect the second target to vertically align the hose with the fuel inlet. The fueling system is further configured to extend the hose outward towards the vehicle to insert the hose into the fuel inlet when the second target is detected and the hose is aligned with the fuel inlet.

The system may include that the fueling system has a pump housing that is stationary relative to the drive system with the hose being movable relative to the pump housing.

The system may include that the first and second targets are different.

The system may include that the drive system has an elongated chain that is powered by a motor with the support member being connected to the chain.

The system may include that the support member is a flat plate and the drive system further includes an actuator operatively connected to the plate to move the plate along the lane.

The system may include that the fueling system is configured to detect the second target after the vehicle has been horizontally aligned along the lane by the alignment system.

The system may include an actuator system to open a fuel door that extends across the fuel inlet.

Another embodiment is directed to an automated system to fuel a vehicle such that a user remains within the vehicle during fueling. The system includes a first target configured to be positioned on the vehicle at a first location; a second target configured to be positioned on the vehicle at a second location that is separate from the first target; a fueling system configured to deliver the fuel to the vehicle and including a body and a hose with the hose configured to move relative to the body between extended and retracted positions; a first sensor configured to horizontally align the vehicle with the fueling system as the vehicle moves through the system with the first sensor configured to detect the first target when a fuel inlet of the vehicle is horizontally aligned with the fueling system;

and a second sensor configured to vertically align the hose with the fuel inlet of the vehicle with the second sensor configured to detect the second target when the hose is vertically aligned with the fuel inlet. The fueling system is configured to move the hose from the retracted position to the extended position when the first and second targets are detected by the first and second alignment systems.

The system may include that the second sensor is positioned on the hose of the fueling system.

The system may include a payment system that includes a module configured to be positioned on the vehicle and a sensor to detect the module.

The system may include that the first and second targets include different sizes.

The system may include a drive system configured to move the vehicle from a first point to the fueling system while the vehicle is off.

The drive system may include a chain drive with a dolly configured to receive a tire of the vehicle.

The drive system may include a plate sized to receive at least a portion of the vehicle and an actuator configured to move the plate from the first point to the fueling system.

The system may include an actuator system to open a fuel door that extends across the fuel inlet with the actuator system configured to open the fuel door after the first sensor detects the first target.

Another embodiment is directed to an automated system to fuel a vehicle such that a user remains within the vehicle during fueling. The system includes a controller configured to: determine that the vehicle is moving along a lane; receive a first signal from a first sensor that detects a first target on the vehicle indicating that a fuel inlet of the vehicle is horizontally aligned with a fuel hose; stop the vehicle when the fuel inlet is horizontally aligned with the fuel hose; vertically move the fuel hose relative to the fuel inlet; receive a second signal from a second sensor when the second sensor detects a second target indicating that the fuel hose is vertically aligned with the fuel inlet of the vehicle; extend the fuel hose outward towards the vehicle; receive a third signal from a third sensor when the fuel hose is inserted into the fuel inlet of the vehicle; and deliver fuel through the fuel hose to the vehicle after receiving the third signal.

The system may include that the controller is further configured to start vertically moving the fuel hose after receiving the first signal from the first sensor.

The system may include that the second sensor is connected to the fuel hose.

The system may include that the first sensor is configured to detect the first target that is positioned on a leading side of the fuel inlet and the second sensor is configured to detect the second target that is positioned on an opposing trailing side of the fuel inlet.

The system may include that the controller is further configured to receive payment prior to delivering the fuel to the vehicle.

The various aspects of the various embodiments may be used alone or in any combination, as is desired.

DETAILED DESCRIPTION

The present application is directed to an automated fueling system in which an operator remains in their vehicle. The fueling system is configured to obtain transaction information from the operator, align the vehicle relative to a fuel pump, and to deliver the fuel to the vehicle. Once the process is complete, the operator can drive their vehicle away from the station.

Figure 1:
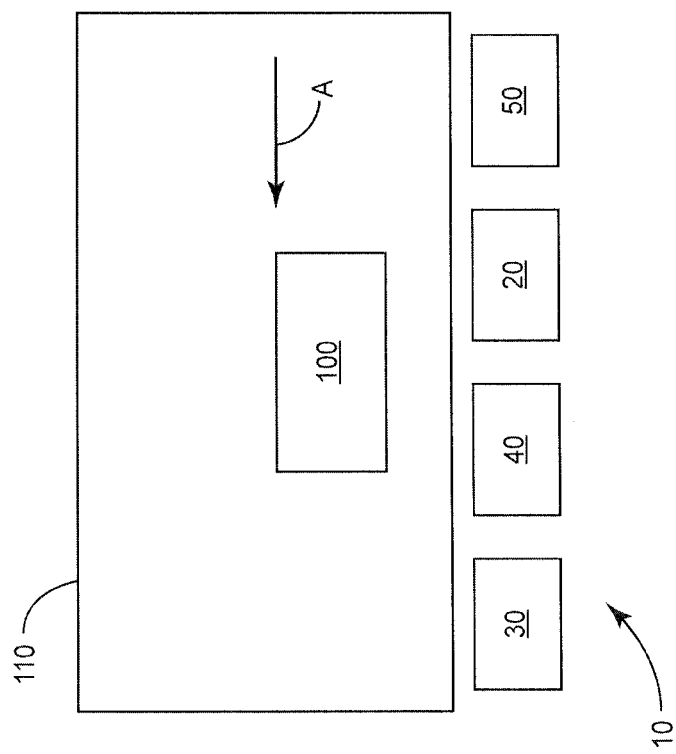
FIG. 1 is a schematic view of an automated fueling system.

FIG. 1 is a schematic view of an automated fueling system 10. The system 10 is incorporated into a fueling station with a lane 110 configured to service the vehicle 100 that moves in the direction of arrow A. The system 10 includes a payment system 20 for paying for the fuel that is to be delivered to the vehicle 100. The system 10 also includes an alignment system 30 for aligning the vehicle 100 in the proper position to receive the fuel. The system 10 also includes a fueling system 40 for delivering the fuel to the vehicle 100. The system 10 may also include a controller 50 that oversees and controls the fueling system 10.

The payment system 20 is configured for the user to pay for the fuel that is delivered to their vehicle 100. The payment system 20 may also be configured for the user to select the type of fuel (e.g., 87 octane, 89 octane, 91 octane, diesel). Further, the payment system 20 may be configured for the user to select the amount of fuel. In some embodiments, the user is required to pay for their fuel prior to proceeding through the system 10. Other embodiments provide for the user to pay after the fuel is delivered to their vehicle.

Figure 2:
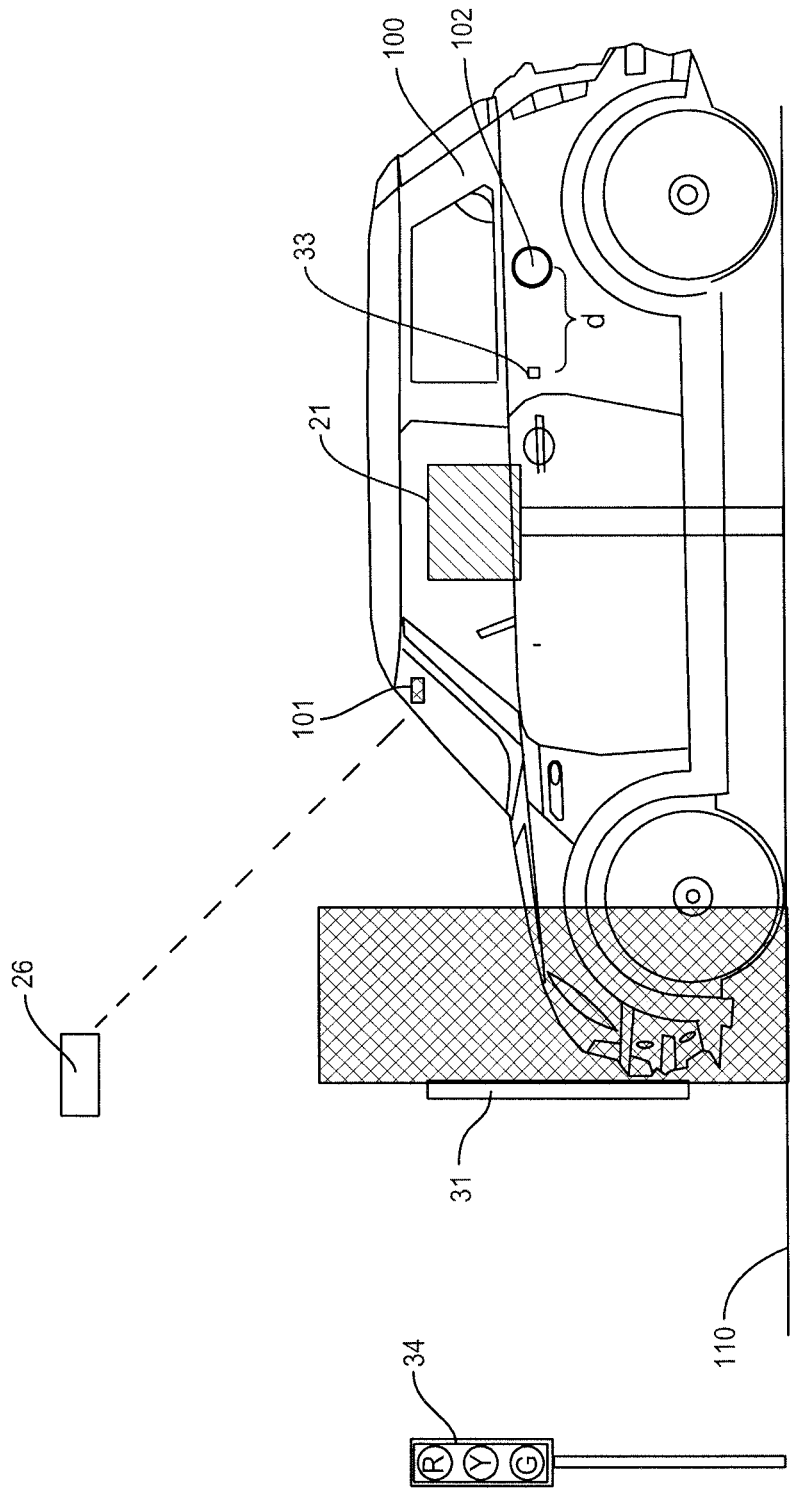
FIG. 2 is a schematic side view of a vehicle positioned in a lane of an automated fueling system.
Figure 3:
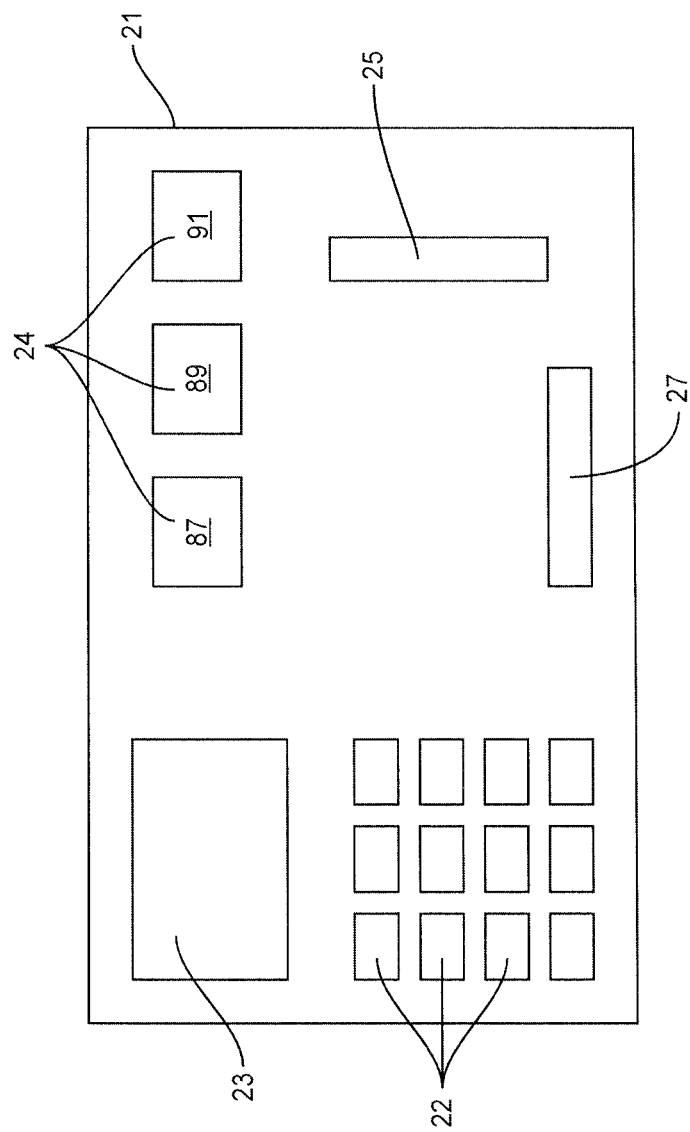
FIG. 3 is a front view of an interface station of a payment system.

As illustrated in FIG. 2, the payment system 20 may include an interface station 21 positioned in proximity to the lane 110. The interface station 21 is positioned to be accessed by a user who is sitting in their vehicle. FIG. 3 illustrates an embodiment of the interface station 21 for the user to make their applicable selections regarding the fueling transaction. The interface station 21 may include a card reader 25 for a user to slide their credit card to enter credit information. Further, input keys 22 and a screen 23 may provide for the user to enter additional information that may be necessary for the transaction, such as credit card information and an amount of fuel. Separate input keys 24 may be designated for the user to select the desired fuel type. The interface station 21 may further include an insertion slot 27 configured to receive paper currency that is input by the user. Associated with the insertion slot is a change dispenser for dispensing coins to the user.

The payment system 20 may also include electronic collection. As illustrated in FIG. 2, electronic collection includes a sensor 26 configured to detect an on-board module 101 positioned on the vehicle 100. The sensor 26 is positioned in proximity to the lane 110 to read the module 101 and obtain the relevant information. The module 101 is positioned on the vehicle 100 at a point that is able to be read by the sensor 26. Examples of positioning may include on the dashboard, back window, or side window. The sensor 26 and module 101 may include a variety of different technologies, including but not limited to RFID and bar-code technology.

The user sets up an account with the system that allows them to use the fueling process. The account includes information for billing purposes, such as the user's name, address, and payment information. The account may also include fueling preferences, such as type of fuel, amount of fuel to be delivered during a stop, and vehicle information. The module 101 includes identification information that is detected by the sensor 26 and used for accessing the user's account. The account information is then used for completing the fueling process and relevant charges are billed to the account.

In some embodiments, the payment process includes usage of just one of the interface station 21 or the sensor 26/module 101. In other embodiments, the two aspects are used in combination. For example, the user may initially select the amount and type of fuel through the interface station 21. The user may then input an option such that the fuel is charged to the account that is detected by the sensor 26 through the module 101.

Figure 4:
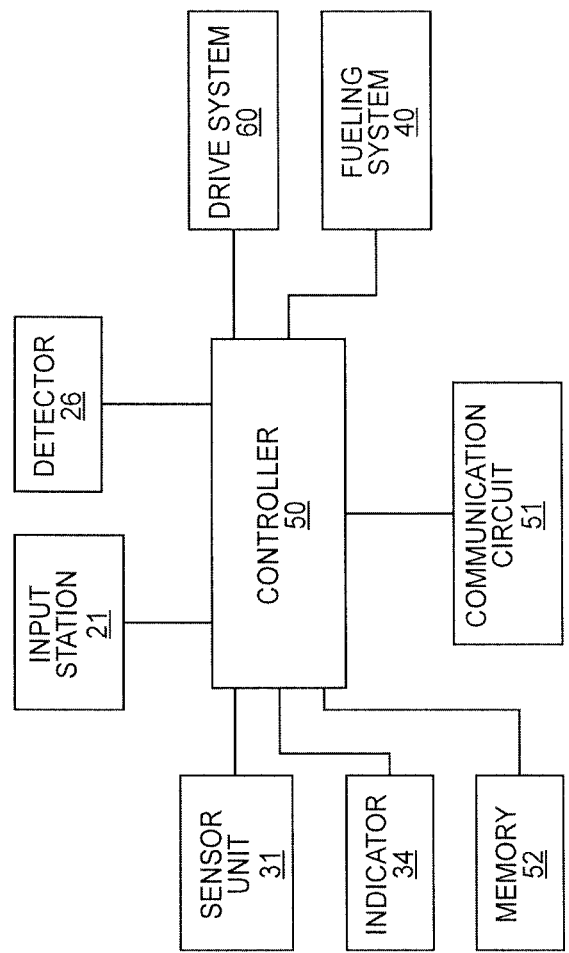
FIG. 4 is a schematic view of elements of an automated fueling system.

A controller 50 may oversee the fueling process of the system 10, including the payment system 20. As illustrated in FIG. 4, the controller 50 may include one or more processors, controllers, hardware circuits, and/or a combination thereof to control the various systems 20, 30, 40, and the various components associated with the system 10. Controller 50 may include memory 52 that stores needed data and programs needed to execute program code to control the various systems 20, 30, 40 and their functions. Controller 50 may include one or several types of memory, including read-only memory, random-access memory, flash memory, magnetic or optical storage devices, or the like. In some embodiments, one or more physical memory units may be shared by the various systems 20, 30, 40. Other embodiments may have physically separate memories for one or more of the different systems 20, 30, 40.

The controller 50 may also include a communications circuit 51 for communications with one or more of the other systems and components. The circuit 51 may include an antenna to facilitate the communications. The circuit 51 may include a radio frequency transmitter and receiver for transmitting and receiving signals through the antenna. Controller 50 may also be wired to one or more of the components of the systems 20, 30, 40.

The communications circuit 51 may also provide for communicating with a controller in the vehicle. Communications circuit 51 may be configured to exchange data with the vehicle over short distances, such as through Bluetooth technology and the like.

Figure 13:
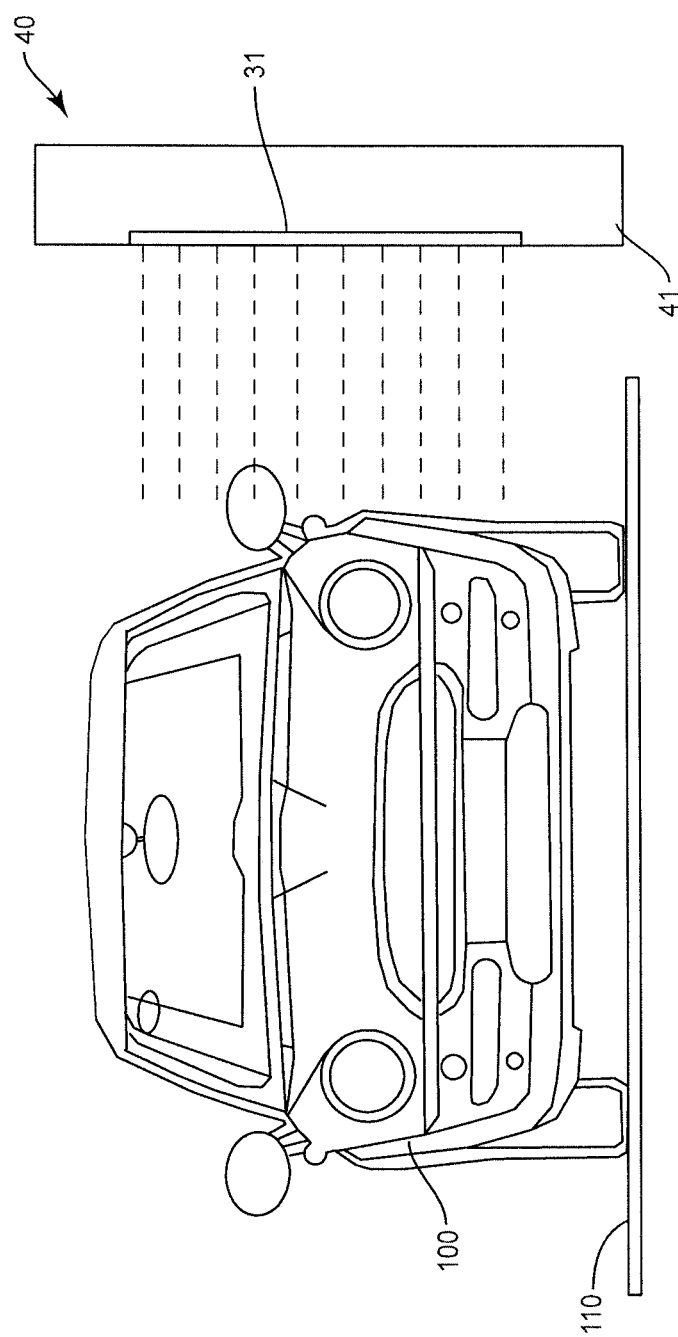
FIG. 13 is a front schematic view of a vehicle positioned relative to an alignment system that includes at least one sensor unit.

The alignment system 30 provides for aligning the vehicle 100 relative to the fueling system 40. This alignment may provide for horizontally positioning a fuel inlet 102 of the vehicle with the fueling system 40. As illustrated in FIGS. 2 and 13, the alignment system 30 includes a sensor 31 positioned in proximity to the lane 110.

The alignment system 30 also includes a target 33 that is detected by the sensor 31. The target 33 may include a variety of different aspects. Examples of the target 33 include a reflector, laser, photoelectric transmitter or receiver, proximity switch, bar code, laser detector, and edge alignment device. In one embodiment, the target 33 emits a signal that is detected by the sensor 31. In another embodiment, the target 33 is passive and does not emit a signal. In one embodiment as illustrated in FIG. 13, the sensor 31 includes one or more transceivers that emit a signal and receive a returned signal that indicates the position of the target on the vehicle 100.

The target 33 is connected to the vehicle 100 in an orientation to be detected by the sensor 31. In one embodiment as illustrated in FIG. 2, the target 33 is positioned on the vehicle 100 at a predetermined location. In one embodiment, the target 33 is positioned a predetermined distance d from the fuel tank inlet 102. The distance d may be based on the distance that the sensor unit 31 is positioned from the fueling system 40 as will be explained in more detail below. Depending upon one or more of the sensor 31, the target 33, and the fueling system 40, target 33 may be positioned at a variety of locations on the vehicle 100.

In use, the sensor unit 31 is directed towards the lane 110 and scans the vehicle 100 as it passes. The sensor unit 31 detects the target 33 at a point where the vehicle 100 is positioned along the lane 110 with the fuel inlet 102 aligned with the fueling system 40. The detection of the target 33 by the sensor unit 31 causes the system 10 to stop the vehicle 100 from moving farther along the lane 110.

The system 10 may be configured for the user to drive their vehicle 100 along the lane 110 until the alignment system 30 detects the target 33. To facilitate the positioning of the vehicle 100, the alignment system 30 may further include an indicator 34 positioned in the dash of the vehicle 100 or along the lane 110 to indicate to the user the position of the vehicle 100. Indicator 34 may include one or more lights that are illuminated depending upon the position of the vehicle. In one embodiment, the indicator 34 includes a green light, yellow light, and a red light. Initially, the green light is illuminated as the vehicle 100 is moving along the lane 110. As the vehicle 100 approaches the fueling system 40, the yellow light is illuminated to indicate to the user that the vehicle 100 is approaching the predetermined position. The red light is illuminated when the vehicle 100 reaches the predetermined position and the sensor 31 detects the target 33.

In one embodiment, the sensor 31 is able to determine when the target 33 is approaching the predetermined alignment position. The sensor 31 may receive a first signal having a first characteristic when the target 33 is approaching. This may result in the yellow light being displayed on the indicator 34. The sensor 31 may also be configured to receive a second signal with a different second characteristic when the target 33 is aligned with the alignment position. This results in the red light being displayed on the indicator 34. In one embodiment, the characteristic is a signal strength of a signal that is emitted by the sensor 31, reflected from the target 33, and detected by the sensor 31. As the target approaches the alignment position the signal strength is a first amount. When the target reaches the alignment position, the signal strength is a second amount.

Figure 5:
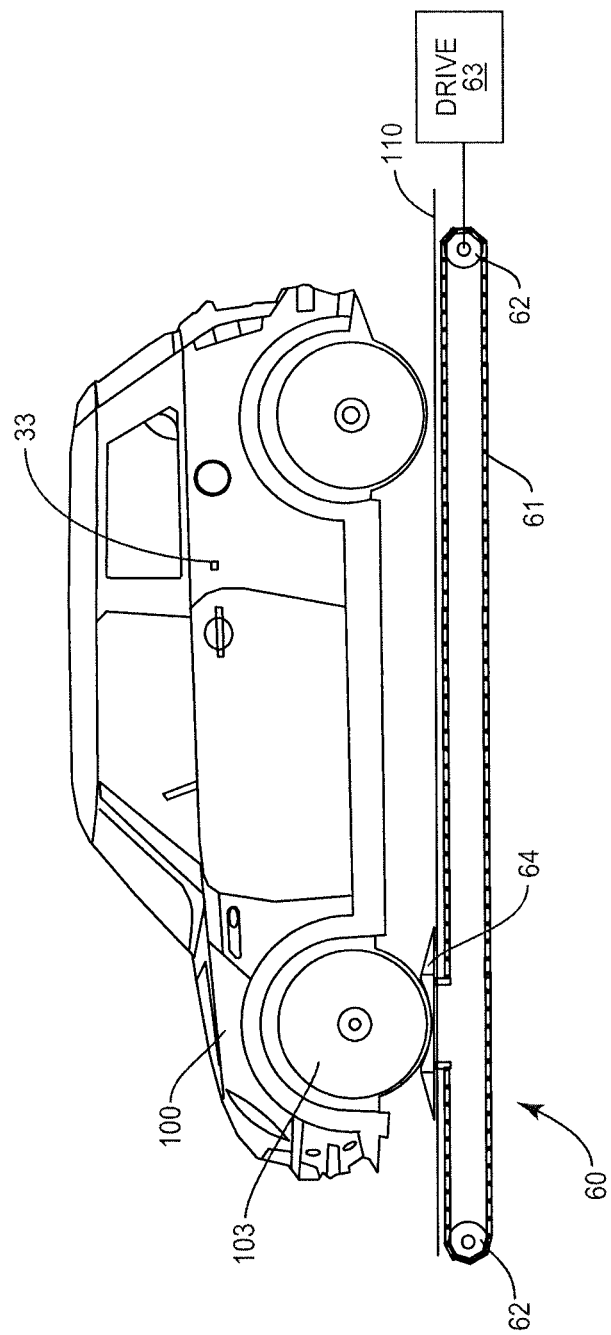
FIG. 5 is a schematic side view of a vehicle on a drive system that moves the vehicle along a lane.

The vehicle 100 may move along the lane 110 in different manners. In one embodiment, the vehicle 100 is driven by the user from the payment system 20 to the fueling system 40. In another embodiment, the system 10 includes a drive system 60 to move the vehicle 100 along the lane 110. FIG. 5 includes a drive system 60 that includes a chain 61 that extends around gears 62 and is driven by a motor 63. The system further includes a dolly 64 configured to receive one or both front tires 103 of the vehicle 100. In use, the user drives the vehicle 100 and positions the front tires 103 on the dolly 64. The drive system 60 is then powered thereby moving the vehicle 100 along the lane 110. The drive system 60 is powered until the vehicle 100 is aligned with the fueling system 40.

Figure 6:
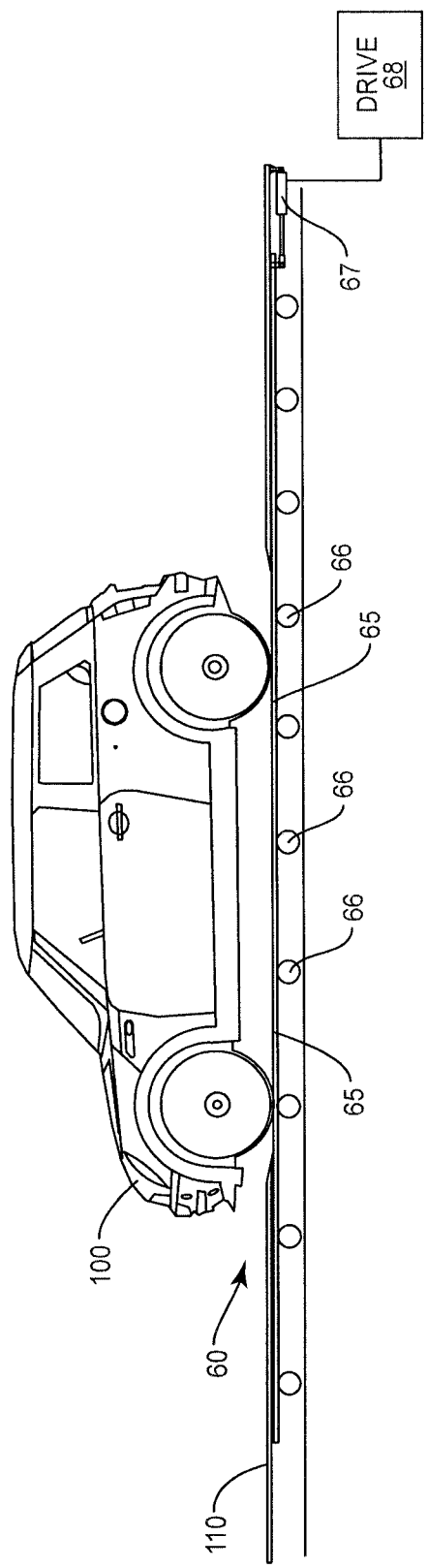
FIG. 6 is a side view of a vehicle on a drive system that moves the vehicle along a lane.

FIG. 6 illustrates another drive system 60 that includes an actuator drive. The system 60 includes a member 65 positioned at the lane 110 on a set of rollers 66. An actuator 67 and associated drive motor 68 is operatively connected to the member 65. The vehicle 100 is driven onto the member 65 and moved along the lane 110 to the alignment position at the fueling system 40.

In the various embodiments, the vehicle 100 is moved to the fueling system 40. If the user is driving the vehicle 100, the user is instructed to turn off the ignition switch. The user may receive this instruction through various techniques, such as a sign that is flashed on a nearby screen and an audio message played for the user. In embodiments with a drive system 60, the vehicle 100 may be shut off at the time the vehicle 100 is placed on the drive system 60.

The system 10 may be further configured to determine that the vehicle 100 is off during the fueling process. System 10 may include one or more sensors, such as noise sensors or vibration sensors that detect if the vehicle is on. The system 10 may further be configured to communicate with the vehicle 100 through the communications circuit 51 to ensure that the vehicle 100 is off. In the event the vehicle 100 is turned on during the fueling process, the controller 50 may be configured to shut down the fueling and terminate the transaction.

Figure 7:
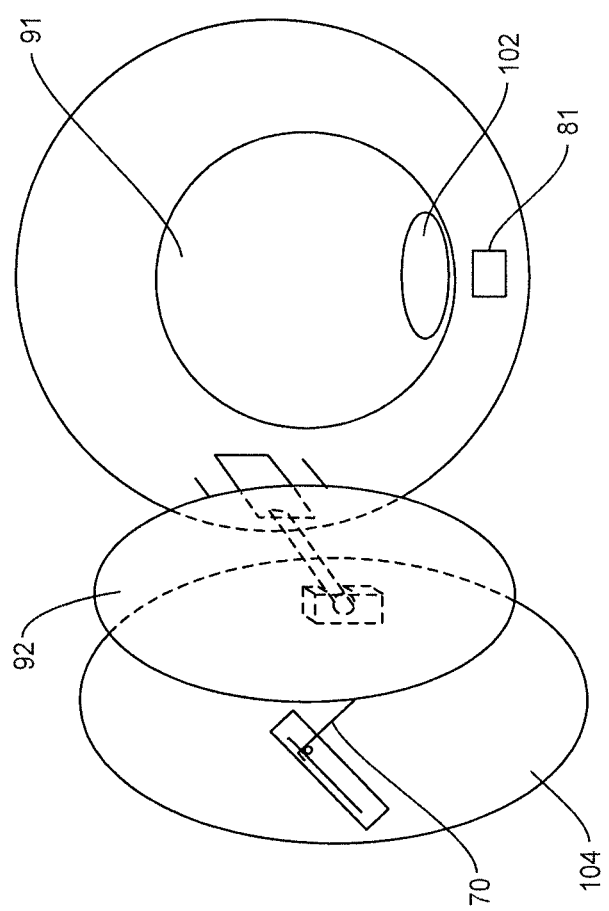
FIG. 7 is a schematic view of fuel door, a funnel cover, an opening of a funnel, a target, and a fuel inlet.

The fuel inlet 102 of the vehicle 100 is protected by a fuel door 104. To facilitate the fueling process and prevent the user from exiting the vehicle 100, the system 10 may be configured to open the fuel door 104. In one embodiment, the driver presses an automatic fuel button that disables the vehicle ignition system and opens the fuel door 104. The fuel door 104 includes an actuator 70 as illustrated in FIG. 7. The actuator 70 opens the fuel door 104 when the vehicle 100 is at the fueling system 40. The actuator 70 may be operated in various ways, including electric, hydraulic, pneumatic, and vacuum devices. In one embodiment, actuator 70 includes a receiver that receives a signal from the controller 50 when the fuel door 104 is to be opened. Actuator 70 is further configured to close the fuel door 104 once the fuel has been delivered to the vehicle 100. In one embodiment, the driver presses the automatic fuel button on the dash which closes the fuel door and enables the vehicle ignition system.

The fuel inlet 102 may also include a funnel 91 to facilitate insertion of a hose of the fueling system 40. The funnel 91 is positioned behind the fuel door 104 and includes an enlarged opening that aligns with the fuel door and a smaller opening that extends into the fuel inlet 102. A cover 92 may extend across the funnel opening. The cover 92 may be connected to the fuel door 104 and be opened and closed with the fuel door 104. In another embodiment, a separate actuator may be connected to the cover 92 and controlled via a signal received from the controller 50 or the automatic fuel button.

A second target 81 is attached to the vehicle 100 in proximity to the fuel inlet. The second target 81 is detected by a sensor 48 on the fueling system 40 when a hose 42 of the fueling system 40 is aligned with the fuel inlet 102. Examples of the target 81 include a reflector, laser, photoelectric transmitter or receiver, proximity switch, bar code, laser detector, and edge alignment device. In one embodiment, the target 81 emits a signal that is detected by the sensor 48. In another embodiment, the target 81 is passive and does not emit a signal. In one embodiment, the sensor 48 includes one or more transceivers that emit a signal and receive a returned signal that indicates the position of the target 81.

The second target 81 may be spaced away from the first target 33. This spacing prevents the first sensor 31 from detecting the second target 81, or the second sensor 48 from detecting the first target 33. The targets 33, 81 may have the same or different configurations.

In one embodiment, the first target 33 is positioned in front of the fuel inlet 102 (i.e., between the fuel inlet 102 and the front of the vehicle 100), and the second target 81 is positioned at a point between the fuel inlet 102 and a back of the vehicle 100. In one embodiment as illustrated in FIG. 7, the target 81 is covered by the fuel door 104. The target 81 is not detectable by the sensor 48 until the fuel door 104 is opened.

Figure 8:
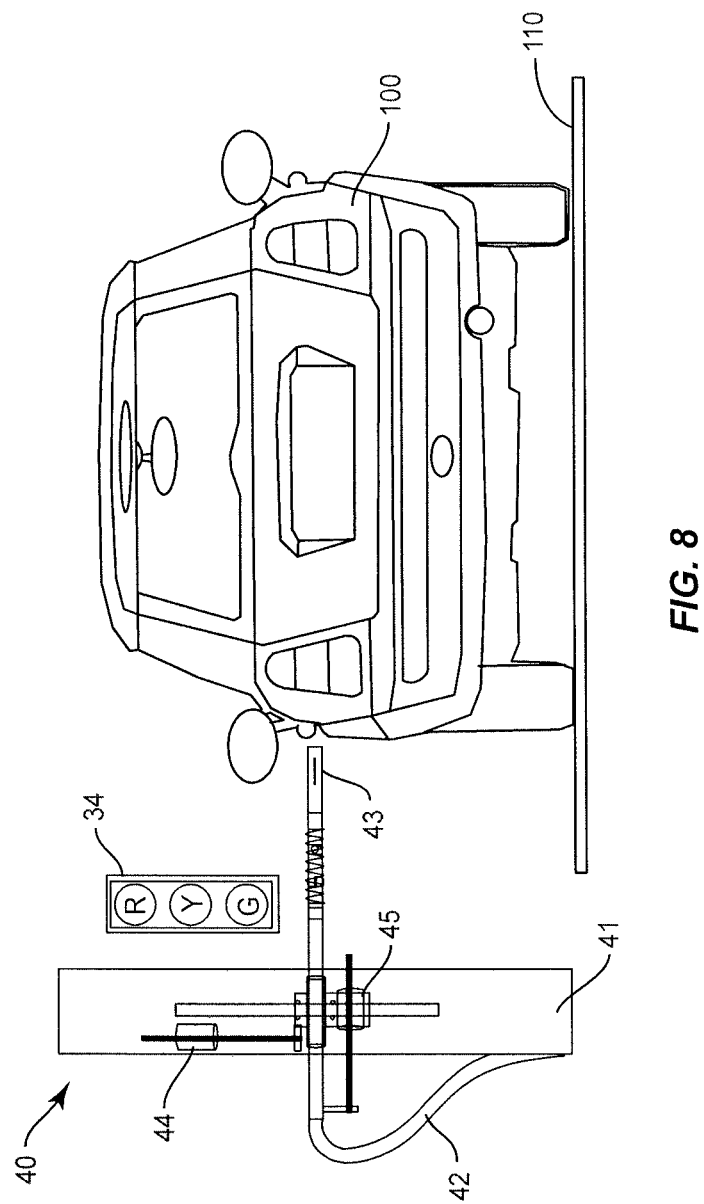
FIG. 8 is a rear schematic view of a vehicle positioned at a fueling system with a fuel hose partially extended from a fuel body.

The fueling system 40 provides for delivering fuel to the vehicle 100. FIG. 8 illustrates the fueling system 40 with an aligned vehicle 100. The fueling system 40 includes a fuel pump housing 41 and a fuel hose 42. A nozzle 43 is positioned at the distal end of the fuel hose 42. The system 40 also includes a vertical movement mechanism 44 for vertically positioning the nozzle 43 relative to the fuel inlet 102 of the vehicle 100, and an extension/retraction mechanism 45 for inserting and removing the nozzle 43 relative to the fuel inlet 102. The mechanisms 44, 45 may include various aspects, such as servo motors and linear actuators, and may include the same or different configurations.

Figure 9:
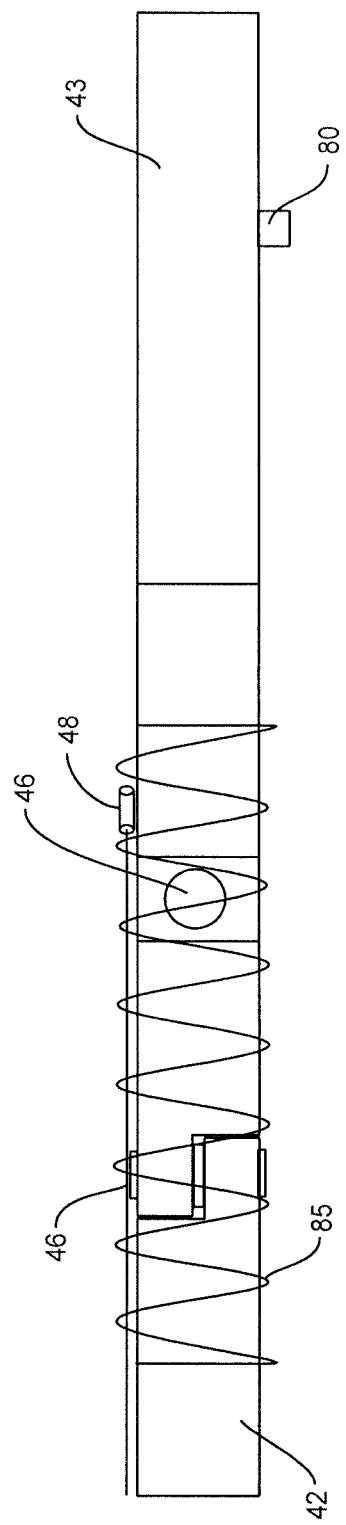
FIG. 9 is a schematic side view of a fuel hose including a pair of joints and a sensor to detect a target.
Figure 12:
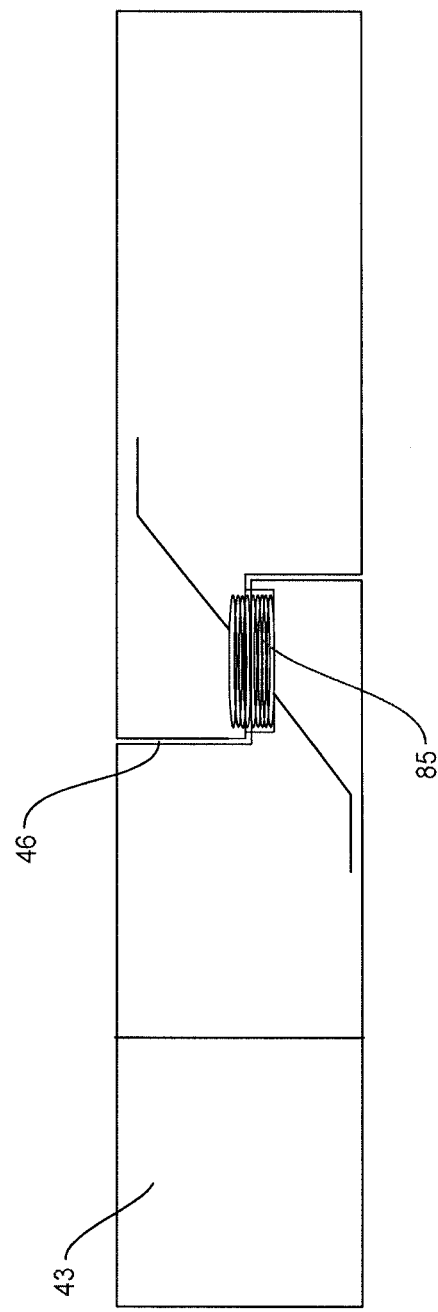
FIG. 12 is a side schematic view of a hose with a joint having a biasing member to maintain a straight orientation.

As illustrated in FIG. 9, the hose 42 may include one or more joints 46 to provide further adjustability for inserting the nozzle 43 into the fuel inlet 102. The joints 46 may be positioned at or spaced away from the nozzle 43. In one embodiment, two or more joints 46 are positioned at different angular orientations to provide for adjustability in two different directions. In the embodiment of FIG. 9, a first joint 46 provides for adjustment in the horizontal plane, and a second joint 46 provides for adjustment in the vertical plane. One or more of the joints 46 may be spring tensioned to remain straight until contact with the opening in the fuel inlet 102. FIG. 12 includes an embodiment with the hose 42 including separate sections that are connected together to form the joint 46. A biasing member, such as a torsion spring, may be positioned into an internal cavity at the joint 46. In another embodiment as illustrated in FIG. 9, a coil spring 85 is placed over the outside of the joint 46. The various configurations of the biasing members are configured to maintain the hose 42 straight until contact with the fuel inlet 102.

The hose 42 may further include a sensor 48 configured to detect the position of the target 81. In one embodiment, the sensor 48 includes one or more transceivers that emit a signal and receive a returned signal that indicates the position of the target 81. In one embodiment, the element 39 is a reflective member that is detected by the sensor 48.

Figure 10:
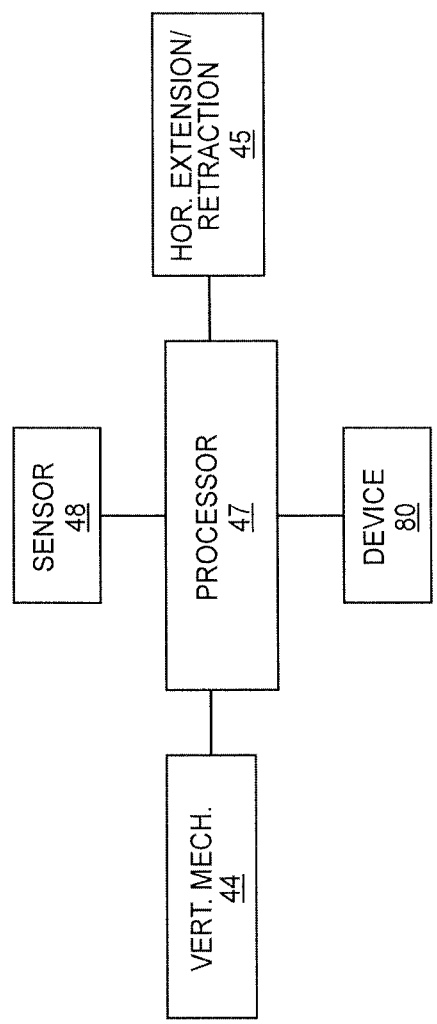
FIG. 10 is a schematic view of elements of a fueling system.

The sensor 48 may be configured to send signals to a processor 47 of the fueling system 40 as illustrated in FIG. 10. The processor 47 receives the signals from the sensor 48 and controls the vertical movement mechanism 44 accordingly. In another embodiment, the fueling system 40 does not include a separate processor 47. Rather, controller 50 receives the signals from the sensor 48 and controls the movement mechanism 44 to vertically position the nozzle 43.

In use, the vehicle is horizontally aligned with the fueling system through the alignment system 30. After horizontal alignment, the fuel door 104 is opened. This is initiated by the driver pressing an automatic fuel button, which also disables the ignition. In another embodiment, the controller 50 may send a signal to the vehicle 100 to initiate opening of the fuel door 104. The fueling system 40 is configured to vertically align the hose 42 with the fuel inlet 102. This occurs by the vertical movement mechanism 44 being activated to vertically move the hose 42 relative to the vehicle 100. The sensor 48 detects the target 81 when the hose 42 is aligned and the vertical movement mechanism 44 is stopped. In one embodiment, the hose 42 may initially be a first vertical position either above or below the fuel inlet 102. The vertical movement mechanism 48 is then operated in a first direction until the sensor 48 detects the target 81.

Once the hose 42 is horizontally and vertically aligned with the fuel inlet 102, the extension mechanism 45 is activated to move the hose 42 outward away from the body 41 and towards the vehicle 100 and into the fuel inlet 102. The position of the nozzle 43 within the inlet 102 may be verified by a device 80 on the nozzle 43. Device 80 may include a sensor or switch that detects the position of the nozzle 43. Embodiments may include a magnetic reed switch, photocell, laser sensor, photocell reflector, or other device designed to provide feedback to the fueling system 40.

Figure 11:
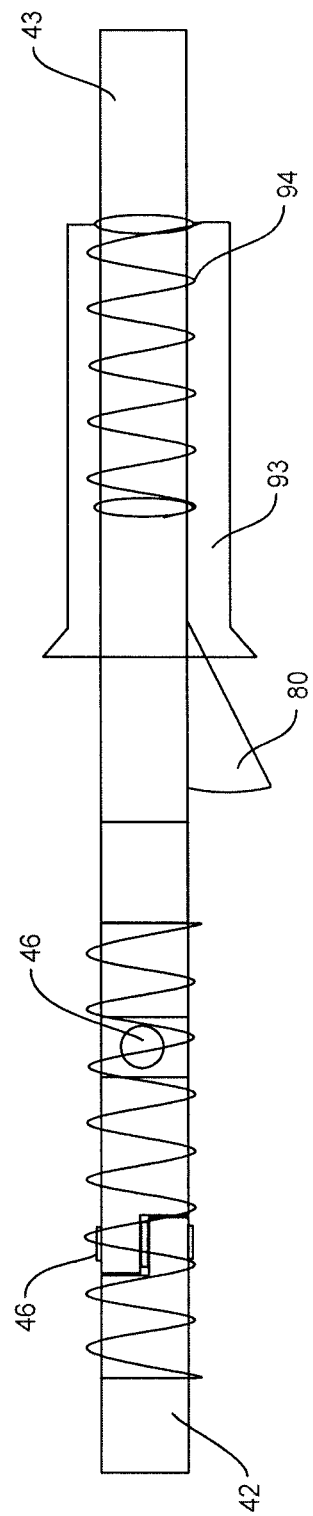
FIG. 11 is a side schematic view of a nozzle of a fuel hose inserted partially within a tube at a fuel inlet.

In one embodiment as illustrated in FIG. 11, the device includes a mechanical pump valve 80 that is biased to a first position. The nozzle 43 includes a tube 93 with a captured spring 94. During extension, the nozzle 43 is inserted into the fuel inlet 102. This causes the valve 80 to be depressed to start fuel flow. At this position, the fueling system 40 delivers fuel through the hose 42 and into the vehicle 100.

After the fuel is delivered, the mechanism 45 retracts the hose 42 away from the vehicle 100. When the nozzle 43 is removed from the tube 93, the outward movement releases the pump valve 80. The hose 42 may be moved to a fully retracted position where it is ready for the next fueling process in a subsequent vehicle. The fuel door 104 is further closed over the fuel inlet 102.

Once the vehicle 100 is fueled, the user may drive the vehicle 100 away from the system 10. In one embodiment, the indicator 34 may illuminate the first light indicating that it is safe for the vehicle 100 to pull away from the system 10.

The processor 47 may oversee the operation of the fueling system 40. The processor may include one or more processors, controllers, hardware circuits, and/or a combination thereof to control the system 40. Processor 47 may also include memory that stores needed data and programs needed to execute program code to control the system 40.

In another embodiment, the fueling system 40 does not include a separate processor 47. Rather, the system controller 50 controls the operation of the fueling system 40.

In one embodiment, a user with an existing vehicle 100 may desire to use the system 10. This requires the user to establish an account for purposes of payment, and also establish preferences that are used during the fueling process. The vehicle 100 is further equipped to use the system 10. This work may be performed by the user, may require the use of a skilled technician, or both. The work includes placing the first and second targets 33, 81 on the vehicle 100. The first target 33 is placed on the vehicle 100 for detection by the alignment system 30. In one embodiment as illustrated in FIG. 2, the first target 33 is placed a predetermined distance d away from the fuel inlet 102. In a specific embodiment, the first target 33 is placed in front of the fuel inlet 102 a distance that corresponds to the distance between the alignment system 30 and the hose 42 of the fueling system 40. The second target 81 is also placed on the vehicle 100 at a second distance from the fuel inlet 102. In one specific embodiment, the second distance is the length between the sensor 48 and a center of the nozzle 43. The targets 33, 81 may be mounted to the vehicle 100 in a variety of different manners, such as with adhesives and mechanical fasteners.

Additional retrofitting of the vehicle 100 may include mounting the module 101 at a position to be read by the sensor 26. This may include placement within the vehicle such as on the dashboard when the module 101 includes electrical components. This may also include placement on a window (exterior or interior side) when the module 101 comprises a bar code or other identification indicia that is read by the sensor 26.

Retrofitting may also include mounting a funnel 91 within the opening for the fuel inlet 102. Likewise, an actuator 70 may be mounted on the vehicle 100 to remotely open the fuel door 104.

For a new vehicle 100, these components may be factory installed during the vehicle manufacturing process.

In use, the user drives their vehicle 100 to a gas station that includes the automated fueling system 10. The user initially positions their vehicle at the payment system 20 to begin the process. The system 10 may determine the payment through the sensor 26 that reads the module 101, through inputs entered by the user through the interface station 21, or both. The system 10 also determines the amount of fuel to deliver to the vehicle 100. This may be a specific fuel amount or dollar amount that is input by the user, or an indication by the user to deliver enough fuel to fill the vehicle fuel tank.

In one embodiment, the payment system 20 is located at a starting point of a lane 110. In the embodiment of FIG. 2, the payment system 20 is spaced away from the alignment system 30 and the fueling system 40. Other embodiments may include the various components positioned at various locations relative to the lane 110.

Once the payment information and fuel information is received by the system, the vehicle 100 is moved along the lane 101 and aligned along the lane by the alignment system 30. In one embodiment, the user drives the vehicle 100 along the lane to the proper position. In this embodiment, the indicator 34 may signal to the user their relative position and the additional amount of movement required to obtain the horizontal alignment. The indicator 34 may initially display a first signal (e.g., a green light) when the vehicle 100 is relatively far from the alignment position, a second signal (e.g., yellow light) when the vehicle is approaching the alignment position, and a third signal (e.g., red light) when the vehicle is at the alignment position.

During movement of the vehicle horizontally along the lane 110, the sensor 31 is active to detect the first target 33. In one embodiment, the sensor 31 is stationary and senses a particular horizontal position along the lane 110. In another embodiment, the sensor 31 may be movable to detect a range of horizontal positions. As the vehicle 100 moves along the lane 110, the sensor 31 scans the vehicle 100 for the target 33. When the vehicle 100 moves a distance to position the target at the detected position, the system 100 stops the forward movement of the vehicle 100. This positioning includes the fuel inlet 102 being horizontally aligned with the hose 42.

In another embodiment, the system 10 includes a drive system 60 to move the vehicle 100 along the lane 110 to the alignment system 30. The user may drive the vehicle 100 along the lane 110 to position at least a portion of the vehicle 100 on a conveyance mechanism. This may include placing the front tires on a dolly 64 or placing the entire vehicle on a movable platform 65. Once positioned, the system 10 activates the drive system 60 and moves the vehicle 100 along the lane 110. The vehicle 100 is moved a distance until the sensor 31 detects the first target 33 at the detected position.

In some embodiments, the sensor 31 is able to detect the approach of the vehicle 100 to the detected position. This may occur by the sensor 31 detecting a particular signal when the target 33 is in the vicinity of the detected position. This may also include the sensor 31 being movable and detecting the target 33 at a point close to but away from the detected position. Readings from the sensor 31 may be used by the controller 50 to illuminate the relevant aspects of the indicator 34.

Once the vehicle 100 is horizontally aligned, the system 10 may ensure that the vehicle is off (i.e., the ignition switch is turned off). The system 10 may include one or more sensors that detect the condition of the vehicle 100 and ensure it remains in this setting. In the event the vehicle 100 is turned on, the system 10 is configured to stop the fueling process.

At some point in the process, the system 10 opens the fuel door 104 that extends over the fuel inlet 102. This may occur by the controller 50 sending a signal to an actuator 70 to open the door 104.

Once horizontally aligned, the fueling system 40 vertically aligns the hose 42 with the fuel inlet 102. Initially, the hose 42 may be at a retracted position away from the lane 110 and in a minimum or maximum vertical position. The system 10 activates a vertical movement mechanism 44 and moves the hose 42 vertically. A sensor 48 on the hose 42 detects the alignment with a second target 81. When the hose 42 moves to a vertical position with the sensor 48 aligned with the target 81, the vertical movement mechanism 44 is stopped to maintain the vertical position of the hose 42.

At this point, the hose 42 is horizontally and vertically aligned with the fuel inlet 102. The fueling system 40 then activates an extension mechanism 45 to move the hose 42 to extend outward to insert the nozzle 43 into the fuel inlet 102. The fuel inlet 102 may be equipped with a funnel 91 and tube 93 to facilitate the insertion of the nozzle 43. Due to the various angles the fuel inlet 102 may be oriented to, the nozzle 43 may need to have one or more horizontal and vertical swivel joints 46 to facilitate the insertion of the nozzle 43. These joints 46 may be spring tensioned to remain straight until contact with the fuel inlet 102. In one embodiment, the joints 46 are configured to bend upon contact with a funnel 91 at the fuel inlet 102. The spring tensioning to maintain the nozzle 43 in a straight orientation may be accomplished by a torsion spring positioned in an internal cavity of the joint 46, or a coil spring placed over the outside of the joint 46 to hold the nozzle 43 in the straight orientation until contact with the fuel inlet 102. The hose 42 may be equipped with a device 80 to detect when the nozzle 43 is inserted in to the fuel inlet 104. The device 80 signals the fueling system 40 which stops the extension mechanism 45 and maintains the nozzle 43 within the inlet 102.

The fuel is then pumped through the hose 42 and into the vehicle 100. Once complete, the hose 42 is retracted from the fuel inlet 102 and positioned at a retracted position in proximity to the body 41. Further, the fuel door 104 is closed, such as by sending a signal to the actuator 70 to move the door 104 to the closed position. Further, the user is notified that the fueling process is complete and that they are able to drive the vehicle 100 away from the fueling system 10.

In some embodiments, one or both targets 33, 81 are equipped to detect a signal transmitted from the respective sensors 31, 48. The targets 33, 81 are equipped to thereafter transmit a signal to the system 10 indicating that the respective sensor is aligned with the target.

FIG. 1 includes a system 10 positioned on a first side of the vehicle lane 110. The station 10 may further be configured with additional lanes 110 that accommodate vehicles 100 with fuel inlets 102 at different locations. For example, a separate lane 110 may be configured to accommodate fueling vehicles 100 with fuel inlets on the passenger side. Further, an additional lane 110 may be configured to accommodate vehicles 100 with fuel inlets 102 at the rear of the vehicle 100.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An automated system to fuel a vehicle such that a user remains within the vehicle during fueling, the system comprising:
   a drive system including a support member configured to be positioned under the vehicle and sized to receive at least one tire of the vehicle, the drive system configured to move the support member and the vehicle along a lane;
   an alignment system configured to be positioned at a stationary point along the lane and configured to align the vehicle at a predetermined position along the lane as the vehicle is being moved by the drive system, the alignment system including a first target mounted to the vehicle at a first distance from a fuel inlet of the vehicle and a first sensor to detect the first target when the vehicle is at the predetermined position; and
   a fueling system configured to be positioned along the lane and including a hose, a second sensor mounted to the hose, and a second target mounted to the vehicle at a second predetermined distance from the fuel inlet, the second target being spaced apart from the first target, the sensor configured to detect the second target to vertically align the hose with the fuel inlet, the fueling system further configured to extend the hose outward towards the vehicle to insert the hose into the fuel inlet when the second target is detected and the hose is aligned with the fuel inlet;
   the alignment system configured to horizontally align the hose with the fuel inlet.

2. The automated system of claim 1, wherein the fueling system comprises a pump housing that is stationary relative to the drive system with the hose being movable relative to the pump housing.

3. The automated system of claim 1, wherein the first and second targets are different.

4. The automated system of claim 1, wherein the drive system includes an elongated chain that is powered by a motor with the support member being connected to the chain.

5. The automated system of claim 1, wherein the support member is a flat plate and the drive system further includes an actuator operatively connected to the plate to move the plate along the lane.

6. The automated system of claim 1, wherein the fueling system is configured to detect the second target after the vehicle has been horizontally aligned along the lane by the alignment system.

7. The automated system of claim 1, further comprising an actuator system to open a fuel door that extends across the fuel inlet.

8. An automated system to fuel a vehicle such that a user remains within the vehicle during fueling, the vehicle having a fuel door that extends over a fuel inlet, the system comprising:
- a first target configured to be positioned on the vehicle at a first location;
- a second target configured to be positioned on the vehicle at a second location, the second target being separate from the first target;
- a fueling system configured to deliver the fuel to the vehicle, the fueling system comprising a body and a hose with the hose configured to move relative to the body between extended and retracted positions;
- a stationary first sensor configured to horizontally align the vehicle with the fueling system as the first target on the vehicle moves through the system relative to the first sensor, the first sensor configured to detect the first target when the fuel inlet of the vehicle is horizontally aligned with the fueling system, the first sensor spaced away from the fueling system to detect the first target that is positioned on the vehicle upstream from the fuel door when the fuel door is horizontally aligned with the fueling system and the target has moved past the fueling system;
- a second sensor configured to vertically align the hose with the fuel inlet of the vehicle, the second sensor configured to detect the second target when the hose is vertically aligned with the fuel inlet;
- the fueling system configured to move the hose from the retracted position to the extended position when the first and second targets are detected by the first and second sensors.

9. The automated system of claim 8, wherein the second sensor is positioned on the hose of the fueling system.

10. The automated system of claim 8, further comprising a payment system that includes a module configured to be positioned on the vehicle and a sensor to detect the module.

11. The automated system of claim 8, wherein the first and second targets include different sizes.

12. The automated system of claim 8, further comprising a drive system configured to move the vehicle from a first point to the fueling system while the vehicle is off.

13. The automated system of claim 12, wherein the drive system includes a chain drive with a dolly configured to receive a tire of the vehicle.

14. The automated system of claim 12, wherein the drive system includes a plate sized to receive at least a portion of the vehicle and an actuator configured to move the plate from the first point to the fueling system.

15. The automated system of claim 8, further comprising an actuator system to open a fuel door that extends across the fuel inlet, the actuator system configured to open the fuel door after the first sensor detects the first target.

16. The automated system of claim 8, further comprising a third sensor that detects one of noise and vibration to determine whether the vehicle is off.

17. An automated system to fuel a vehicle such that a user remains within the vehicle during fueling, the system comprising:
- a controller configured to:
  - determine that the vehicle is moving along a lane and moving relative to a stationary first sensor;
  - receive a first signal from the first sensor that detects a first target on the vehicle that is positioned upstream from a fuel inlet of the vehicle indicating that the fuel inlet of the vehicle is horizontally aligned with a fuel hose;
  - stop the vehicle when the fuel inlet is horizontally aligned with the fuel hose and the first target has moved upstream from the fuel hose;
  - vertically move the fuel hose relative to the fuel inlet;
  - receive a second signal from a second sensor when the second sensor detects a second target indicating that the fuel hose is vertically aligned with the fuel inlet of the vehicle;
  - extend the fuel hose outward towards the vehicle;
  - receive a third signal from a third sensor when the fuel hose is inserted into the fuel inlet of the vehicle; and
  - deliver fuel through the fuel hose to the vehicle after receiving the third signal.

18. The automated system of claim 17, wherein the controller is further configured to start vertically moving the fuel hose after receiving the first signal from the first sensor.

19. The automated system of claim 17, wherein the controller is further configured to receive payment prior to delivering the fuel to the vehicle.

20. The automated system of claim 17, wherein the controller is further configured to receive a signal from a fourth sensor indicating that the vehicle is off prior to delivering fuel through the fuel hose to the vehicle.

* * * * *